(12) United States Patent
Miyazaki et al.

(10) Patent No.: US 6,336,847 B1
(45) Date of Patent: Jan. 8, 2002

(54) METHOD AND APPARATUS FOR HONING A CHIP SAW

(75) Inventors: Chikara Miyazaki; Tsutomu Ichikawa, both of Hamamatsu (JP)

(73) Assignee: Kabaushiki Kaisha Trigger, Shizuoka (JP)

( * ) Notice: Subject to any disclaimer, the term of this patent is extended or adjusted under 35 U.S.C. 154(b) by 0 days.

(21) Appl. No.: 09/586,225

(22) Filed: Jun. 2, 2000

(30) Foreign Application Priority Data

Jun. 2, 1999 (JP) .......................................... 11-193499

(51) Int. Cl.[7] ................................................ B24B 1/00
(52) U.S. Cl. ......................... 451/59; 451/60; 451/177; 451/210; 451/364; 451/398; 451/446
(58) Field of Search ............................. 451/59, 60, 177, 451/210, 364, 397, 398, 443, 446

(56) References Cited

U.S. PATENT DOCUMENTS

| | | | | |
|---|---|---|---|---|
| 2,675,603 A | * | 4/1954 | Goehle | ........................ 29/95 |
| 3,274,630 A | * | 9/1966 | Mileikowsky et al. | ...... 451/210 |
| 3,748,677 A | * | 7/1973 | Frank et al. | ................. 451/210 |

FOREIGN PATENT DOCUMENTS

JP      11-105002      4/1999

* cited by examiner

Primary Examiner—Joseph J. Hail, III
Assistant Examiner—Shantese McDonald
(74) Attorney, Agent, or Firm—Dennis G. LaPointe; Mason & Associates, PA

(57) ABSTRACT

A chip saw in which chips are brazed onto the peripheral edge thereof is clamped, and is rotated while bringing a rotational brush into contact with a honing-subjected portion of the peripheral edge. A liquid, which has dustproof oil and abrasive powder, provided with abrasive properties is supplied to a part in which the rotational brush is in contact with the honing-subjected portion. Therefore, the work efficiency of honing process is improved, and sawdust is not generated. This makes it possible to easily take countermeasures against environmental problems and effectively use resources. In addition, the liquid can be easily recycled.

42 Claims, 3 Drawing Sheets

METHOD AND APPARATUS FOR HONING A CHIP SAW

BACKGROUND OF THE INVENTION

1. Field of the Invention

The present invention relates to a method and an apparatus for honing a chip saw in which chips are brazed on the peripheral edge of a disk blade.

2. Description of the Prior Art

In general, a chip saw 1 is used when cutting various materials, such as woods, plants, or steel materials. As shown in FIGS. 3 and 4, the chip saw 1 has a disk blade 2 whose peripheral edge is shaped like saw teeth, and chips 3, such as cemented carbide chips, brazed thereto.

Conventionally, the chip 3 is brazed to the blade 2 of the chip saw 1 while performing high frequency induction heating in most cases, and, as shown in FIG. 4, a brazed part 4 of the blade 2 undergoes high frequency quenching and tempering. As a result, the brazed part 4 is partially discolored. Therefore, the periphery of the blade 2 must be subjected to honing in the range of a predetermined width. The honing method of a honing-subjected part 5 is generally a shotblast method in which grainy abrasives are jetted onto the honing-subjected part 5 under predetermined pressure.

However, in the shotblast method, the honing process is performed with jetted grainy abrasives, and the abrasives themselves are decreased, namely, the abrasionwear is enlarged. This requires frequent supply of abrasives, and lowers the efficiency of the honing process. In addition, the cost is undesirable.

Furthermore, abrasives and sawdust are generated during the honing process, and, accordingly, a mechanism is required for collecting them. Furthermore, it is actually difficult to completely collect the sawdust, and, accordingly, there is a fear that a bad influence will be exerted upon the environment of a job site or around a factory. Especially, the resolution of the environmental problem is an international matter by the ISO standards. Furthermore, there is a need to always operate an air source, such as a large sized compressor, to jet the abrasive, and, accordingly, it is difficult to economize on electricity, recycle the abrasives, and promote the effective exploitation of resources, such as electricity or the abrasive.

The present invention was made in consideration of the foregoing. It is an object of the present invention to provide a method and an apparatus for honing a chip saw by which the working efficiency of the honing process can be improved, and countermeasures can be easily taken towards environmental problems or the effective exploitation of resources.

SUMMARY OF THE INVENTION

The present invention is characterized in that a honing method includes the steps of rotating the chip saw in which chips are brazed onto a peripheral edge thereof, bringing a rotational brush into contact with a rotating honing-subjected portion of the peripheral edge of the chip saw, and supplying a liquid having abrasive properties to a part in which the rotational brush is in contact with the honing-subjected portion. Since the liquid that has abrasive properties is supplied, and the honing-subjected portion is honed, the work efficiency of honing process is improved, and the environment is kept good without generating sawdust.

In the above method, the liquid is recycled and is again used. Therefore, resources are effectively used.

Furthermore, in the above method, the chip saw is rotated while being clamped. Therefore, the honing process is carried out stably.

Still furthermore, in the above method, the liquid contains dustproof oil. Therefore, dust is never generated.

Furthermore, in the above method, the liquid contains abrasive powder having abrasive properties. Therefore, the liquid can easily perform the abrasion.

The present invention is characterized in that an apparatus for honing a chip saw comprises a chip saw rotating means for rotating the chip saw in which chips are brazed onto a peripheral edge thereof at a predetermined rotating speed, a brush rotating means for bringing a rotational brush into contact with a honing-subjected portion of the chip saw rotating by the chip saw rotating means while rotating the rotational brush, and liquid supplying means for supplying a liquid having abrasive properties between the rotational brush rotating by the brush rotating means and the honing-subjected portion of the chip saw rotating by the chip saw rotating means. Since the liquid that has abrasive properties is supplied between the rotational brush and the honing-subjected portion of the chip saw by the liquid supplying means, the work efficiency of the honing process is improved, and the environment is kept good without generating sawdust.

In the above apparatus, the chip saw rotating means clamps the chip saw. Therefore, honing process is carried out stably.

Still furthermore, in the above apparatus, the chip saw rotating means includes a first clamp body that does not move in the clamping direction and a second clamp body that can move to and from the first clamp body and sandwich the chip saw together with the first clamp. Therefore, the chip saw can be easily attached by moving the second clam body with respect to the first clamp body.

Furthermore, in the above apparatus, the chip saw rotating means includes a chip saw rotating unit for rotating the first clamp body and a chip saw clamping unit for moving the second clamp body toward or backward and following the rotation of the first clamp body. Therefore, a simple structure is built by rotating the first clamp body that does not move in a clamping direction by the chip saw rotating unit.

Furthermore, in the above apparatus, the liquid contains dustproof oil. Therefore, dust is never generated.

Still furthermore, in the above apparatus, the liquid contains abrasive powder having abrasive properties. Therefore, the liquid can easily perform the abrasion.

The above apparatus further comprises a liquid circulating mechanism for recycling and supplying the liquid that has been used for the honing process to the liquid supplying means. Therefore, resources can be effectively used.

DETAILED DESCRIPTION OF THE PREFERRED EMBODIMENT

An embodiment of the present invention will be described hereinafter with reference to the attached drawings.

Figure 1:
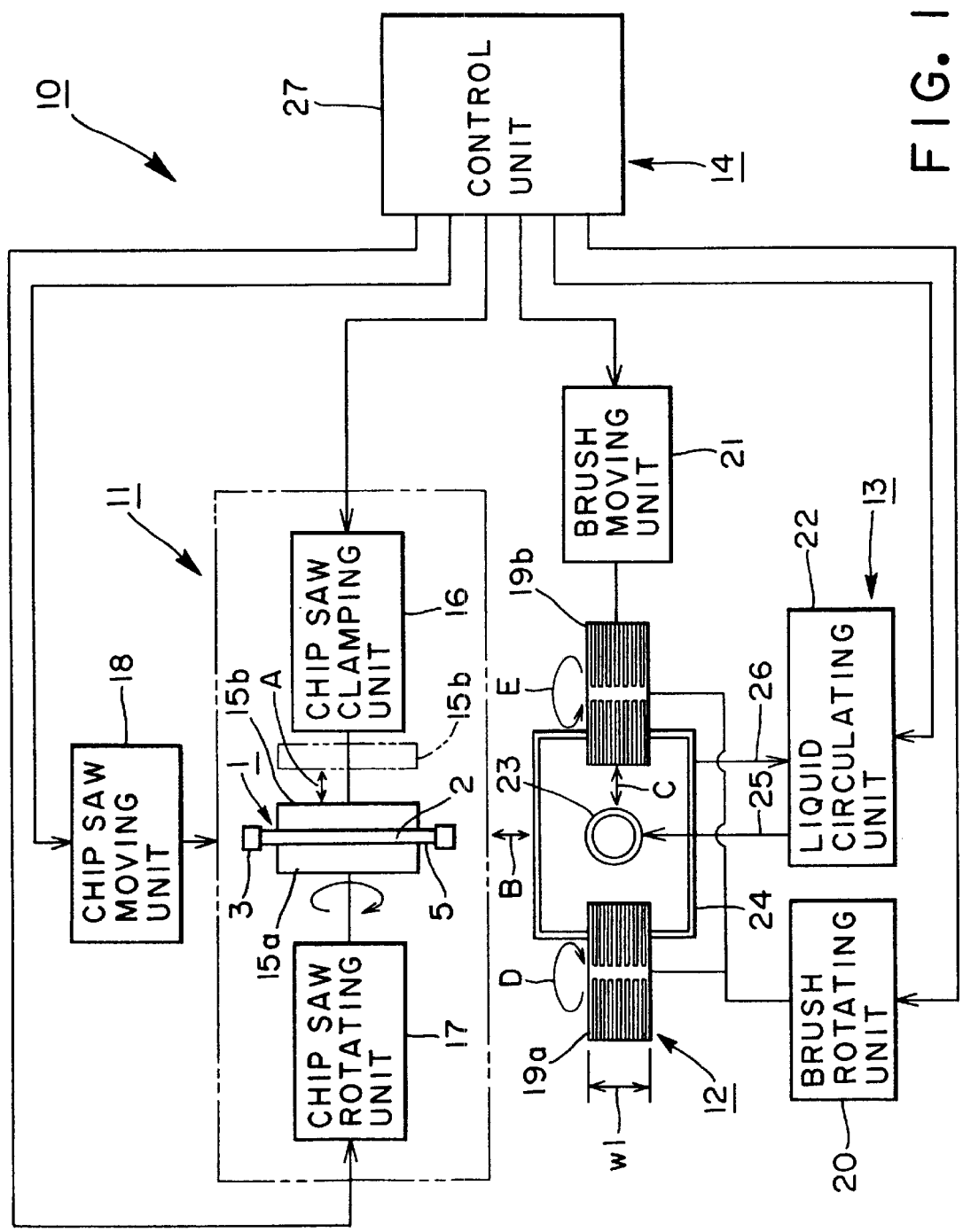
FIG. 1 is a schematic view of the arrangement of an embodiment of a chip saw honing apparatus of the present invention.

As shown in FIG. 1, the honing apparatus 10 includes a chip saw rotating mechanism 11 as a chip saw rotating means, a brush rotating mechanism 12 as a brush rotating means, a liquid circulating mechanism 13, and a control mechanism 14.

Figure 3:
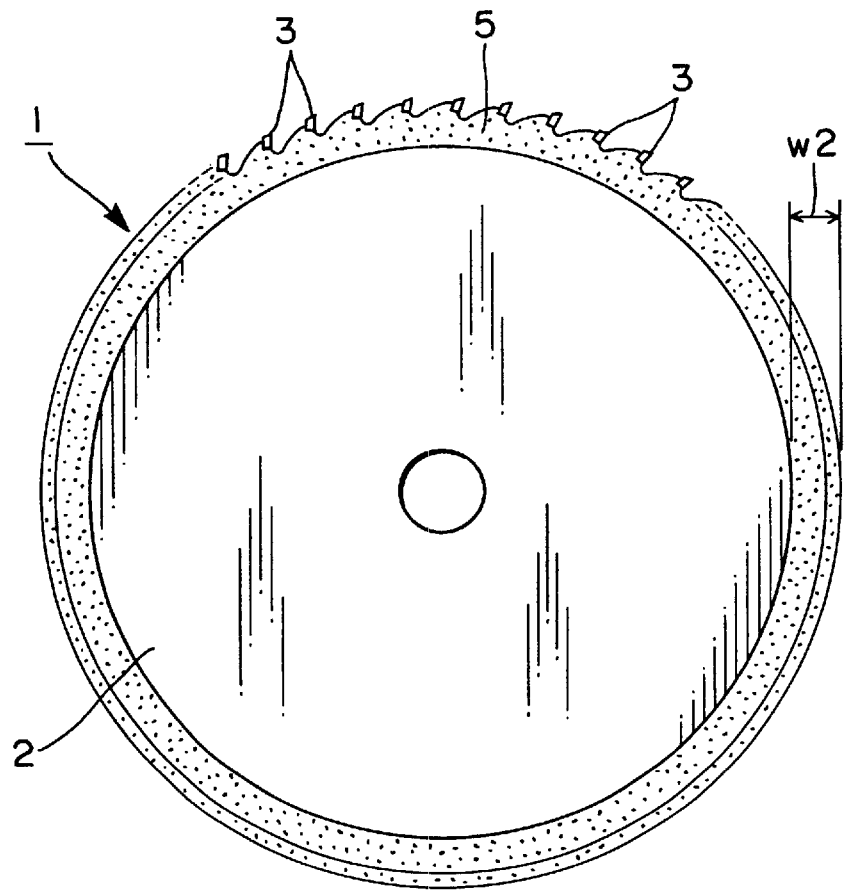
FIG. 3 is a plan view of a chip saw.
Figure 4:
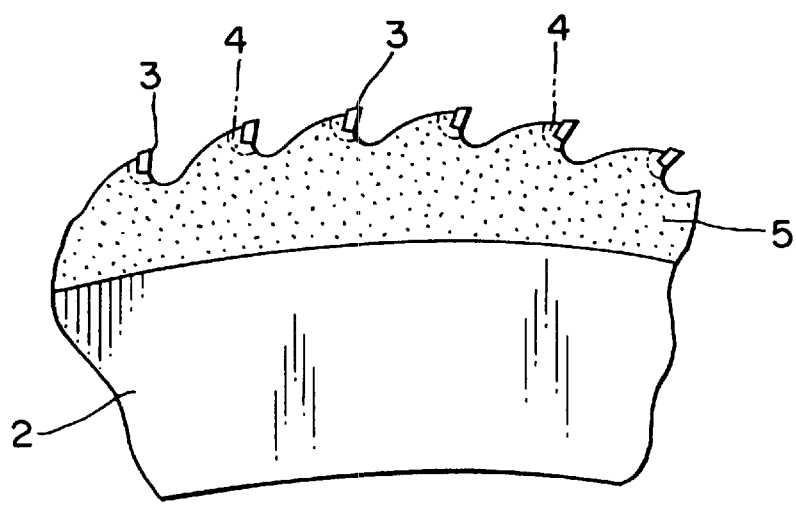
FIG. 4 is an enlarged plan view of the main part of the chip saw.

The chip saw 1 has a disk blade 2 whose peripheral edge is shaped like saw teeth, and chips 3, such as cemented carbide chips, brazed thereto, as was described in "description of the prior art" with reference to FIGS. 3 and 4.

The chip saw rotating mechanism 11 includes disk-shaped clamping plates 15a, 15b, which serve as clamping bodies, for clamping the chip saw 1 in which the chips 3 are brazed to the peripheral edge of the blade 2, in such a way as to squeeze it from the front and back sides of the chip saw 1. The peripheral edge of each of the clamping plates 15a, 15b is situated inside the honing-subjected part 5 of the peripheral of the blade 2.

One of the pair of clamping plates 15a and 15b (e.g., the clamping plate 15a) is connected to a chip saw rotating unit 17 that includes a drive source, such as a motor, and the other one (e.g., the clamping plate 15b) is connected to a chip saw clamping unit 16 that includes a drive source, such as an air or hydraulic cylinder. The clamping plate 15b is moved toward the clamping plate 15a, as shown by arrow A, in accordance with the operation of the chip saw clamping unit 16, so that the chip saw 1 is clamped between the clamping plate 15a and 15b, and, under this state, the clamping plate 15a is rotated in accordance with the operation of the chip saw rotating unit 17, and the other clamping plate 15b follows the rotation, and, as a result, the chip saw 1 is rotated in a predetermined direction.

The chip saw clamping unit 16 and the chip saw rotating unit 17 are connected to a chip saw moving unit 18 that includes a drive source, such as a cylinder. In accordance with the operation of the chip saw moving unit 18, the chip saw 2, which is clamped by the chip saw clamping unit 16 and is rotated by the chip saw rotating unit 17, is moved in or out, as shown by arrow B, between a pair of rotational brushes 19a and 19b.

The brush rotating mechanism 12 includes a pair of rotational brushes 19a and 19b. The rotational brushes 19a and 19b are each formed with a lot of wire brushes. The external shape thereof is circular, and the width w1 thereof is designed to be larger by a predetermined width than the width w2 of the honing-subjected part 5 of the chip saw 1 shown in FIG. 3. Both the rotational brushes 19a and 19b are connected to a brush rotating unit 20 that includes a drive source, such as a motor, and one of them (e.g., the rotational brush 19b) is connected to a brush moving unit 21 that includes a drive source such as a cylinder.

In accordance with the operation of the brush moving unit 21, the rotational brush 19b is moved in the direction of arrow C, so that the interval between the rotational brushes 19a and 19b is set at a predetermined value, and, in accordance with the operation of the brush rotating unit 20, the rotational brush 19a is rotated in the direction of arrow D, so that the rotational brush 19b is rotated in the direction of arrow E, i.e., in the direction opposite to that of arrow D.

A liquid circulating mechanism 13 includes a liquid circulating unit 22 that has a drive source, such as a pump, and a filter for filtering a liquid, a liquid supply nozzle 23 used as a liquid supply means, and a liquid tank 24. The liquid circulating unit 22 is connected to the liquid supply nozzle 23 disposed on the top face of the liquid tank 24 by a supply pipe 25, and is connected to an exhaust hole made in the bottom face of the liquid tank 24 through an exhaust tube 26.

Thus, in accordance with the operation of the liquid circulating unit 22, a liquid in which, for example, dustproof oil and abrasive powder are mixed in a predetermined ratio is supplied from the liquid supply nozzle 23 to between the rotational brushes 19a and 19b through the supply pipe 25. At the same time, a liquid that was used for the honing process and is contained in the liquid tank 24 is returned through the exhaust tube 26. The returned liquid is filtered with a filter or the like, not shown, disposed in the liquid circulating unit 22 or is separated and mixed properly, and is again supplied to the liquid supply nozzle 23 for recycling.

The control mechanism 14 includes a control unit 27 that is formed with, for example, a sequencer and has a timer, not shown. The chip saw clamping unit 16, chip saw rotating unit 17, chip saw moving unit 18, brush rotating unit 20, brush moving unit 21, and liquid circulating unit 22 are connected to the control unit 27. The operation of these units is controlled by the control signal of the control unit 27.

Figure 2:
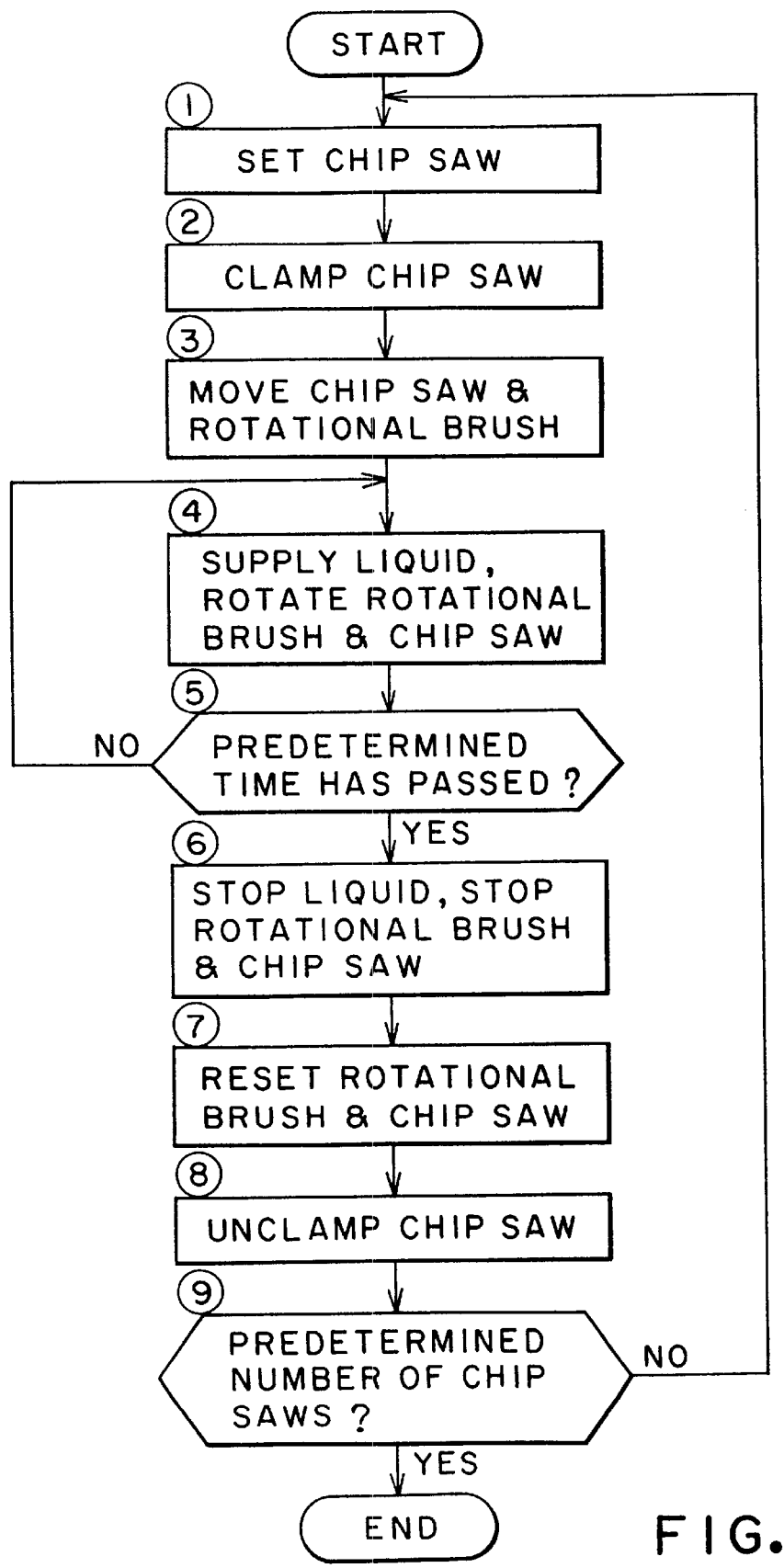
FIG. 2 is a flow chart showing a chip saw honing method of the present invention.

Next, the honing method carried out by the honing apparatus 10 will be described with reference to the flow chart of FIG. 2. The flow chart of FIG. 2 is executed by a program beforehand set in the control unit 27.

When the program is first executed, the chip saw 1 in which chips 3 are brazed to the peripheral edge of the blade 2 is set on the clamping plate 15a (step 1).

When the chip saw 1 is set on the clamping plate 15a, the control unit 27 detects that the chip saw 1 has been set on the clamping plate 15a, and a control signal is output to the chip saw clamping unit 16 so as to actuate the clamping unit 16, thereby moving the clamping plate 15b toward the clamping plate 15a. According to the movement of the clamping plate 15b, the chip saw 1 set on the clamping plate 15a is sandwiched and clamped by the clamping plates 15a and 15b (step 2).

When the chip saw 1 is clamped, a control signal is output from the control unit 27 to the chip saw moving unit 18 so as to actuate the chip saw moving unit 18, and the clamped chip saw 1 is moved toward the rotational brushes 19a and 19b. At the same time, a control signal is output from the control unit 27 to the brush moving unit 21 so as to actuate the brush moving unit 21, and the rotational brush 19b is moved toward the rotational brush 19a by a predetermined distance (step 3).

According to the movement of the chip saw 1 and rotational brush 19b, rotational brushes 19a and 19b are brought into contact with the both sides of the honing-subjected part 5 of the chip saw 1 under a predetermined pressure. In this state, a control signal is output from the control unit 27 to the liquid circulating unit 22 so as to actuate the liquid circulating unit 22, and, through the supply pipe 25 and the liquid supply nozzle 23, a liquid is supplied between the rotational brushes 19a and 19b. At the same time, a control signal is output from the control unit 27 to the chip saw rotating unit 17 and the brush rotating unit 20 so as to actuate the chip saw rotating unit 17 and the brush rotating unit 20, thereby rotating the chip saw 1 and the rotational brushes 19a and 19b (step 4).

In step 4, the liquid is supplied from the upper side to the honing-subjected part 5 of the chip saw 1 between the rotational brushes 19a and 19b, and the honing-subjected part 5 is honed by both the abrasive powder contained in the liquid and by the rotating contact of the tips of the rotational brushes 19a and 19b. The liquid used for the honing process flows downward without any treatment and is carried into the liquid tank 24. Fine particles of, for example, the blade 2 generated by the abrasion during the honing process reach a state of being mixed with the liquid, and never disperse into the surroundings as sawdust. Additionally, the liquid contained in the liquid tank 24 is returned to the liquid circulating unit 22 through the exhaust tube 26, and proper treatment is conducted in the liquid circulating unit 22, it and is again supplied to the liquid supply nozzle 23 to be recycled.

When, in step 4, the liquid is supplied, and the chip saw 1 and the rotational brushes 19a, 19b are rotated, it is judged whether a predetermined time has passed or not (step 5). If the honing time set beforehand by a timer of the control unit 27 has not yet passed, the stage is returned to step 4, and step 4 is repeated. If the honing time has elapsed, a control signal is output from the control unit 27 to the liquid circulating unit 22, the chip saw rotating unit 17, and the brush rotating unit 20, thereby stopping the operation of the units 22, 17, and 20. At the same time, the supply of the liquid is stopped, and the rotation of the chip saw 1 and the rotational brushes 19a, 19b is stopped (step 6).

Thereafter, a control signal is output from the control unit 27 to the brush moving unit 21 so as to actuate the brush moving unit 21, and the rotational brush 19b is moved backward so as to return to a start position. At the same time, a control signal is output to the chip saw moving unit 18 so as to actuate the chip saw moving unit 18, thereby returning the chip saw 1 to a start position (step 7).

When the chip saw 1 returns to the start position, a control signal is output from the control unit 27 to the chip saw clamping unit 16 so as to actuate the chip saw clamping unit 16, and the clamping plate 15b is returned to the start position, thereby unclamping the chip saw 1 (step 8).

The chip saw 1 that has undergone the honing process is detached from the clamping plate 15a in this state, and the control unit 27 judges whether a predetermined number of chip saws 1 have undergone the honing process or not (step 9). If not, in step 9, the system returns to step 1, and the next chip saw 1 is set. If the judgment is affirmative in step 9, the set program ends.

The present invention is not limited to the operation shown by the above flow chart. In step 4 and step 6, the supply and the stop of the liquid are caused to substantially coincide with the rotation and the stop of the chip saw 1 and the rotational brushes 19a, 19b. Instead, they can be operated or stopped in a predetermined order with a predetermined time difference, for example. Besides that, the liquid can be stopped after it has been judged that a predetermined number of chip saws have been honed in step 9, in other words, the liquid can be continuously supplied during the honing process. Concerning this respect, the same can be said of step 3, wherein the chip saw 1 is moved toward the rotational brushes 19a and 19b, and the rotational brush 19b is moved toward the rotational brush 19a by a predetermined distance, and, in step 7, the rotational brush 19b is moved backward so as to return to a start position, and the chip saw 1 is returned to a start position.

According to the honing apparatus 10 of this embodiment, as mentioned above, a pair of rotational brushes 19a and 19b are disposed, and a liquid that contains dustproof oil and abrasive powder is supplied between the rotational brushes 19a and 19b, and, at the same time, a honing-subjected part 5 is subjected to a honing process while clamping and rotating the chip saw 1. Therefore, the time for the honing process can be shortened to 15 seconds per sheet in comparison with the conventional shotblast honing process in which it is about 30 seconds per sheet.

Additionally, a liquid is used for the honing process, and is continuously used while circulating in the liquid circulating unit 22. Therefore, the amount of abrasives is prevented from decreasing because of dispersion as with the conventional grainy abrasives, and there is no need to frequently supply abrasives. Additionally, the automatic honing process can be carried out according to a control signal of the control unit 27 only by setting the chip saw 1 on the clamping plate 15a. Therefore, the work efficiency of the honing process can be greatly improved, and cheap chip saws 1 can be obtained as a result.

Furthermore, a liquid rather than grainy abrasives is used for the honing process. Therefore, sawdust never disperses into the work site during the honing process, and environmental problems at the work site or in the surroundings of a factory do not occur. Additionally, the liquid circulating unit 22, which is the processor of the liquid, can be simply structured, and chip saws 1 excellent in quality can be obtained. Moreover, a small capacity motor or cylinder is used as a drive source, and, therefore, a conventional large-sized compressor, for example, which is always working, is not required, and electric power savings can be realized. Furthermore, the liquid can be recycled, and resources, such as abrasive powder, can be effectively used. These make it possible to obtain a honing apparatus 10 capable of properly meeting the environmental standards demanded worldwide in the present day.

The kind of the liquid in the aforementioned embodiment is an example. A proper liquid can be used in which at least abrasive powder is contained at a predetermined ratio. For example, a liquid can be used in which abrasive powder is contained in dustproof oil and grinding oil. Additionally, the structure or positional relationship of the drive sources or the structure of the control unit 27 can be changed. For example, a microcomputer can be used instead of the sequencer.

In the above embodiment, the other clamping plate 15b is moved by the chip saw clamping unit 16 in order to clamp the chip saw 1. Instead, both clamping plates 15a and 15b, for example, can be moved by the chip saw clamping unit 16 in order to clamp the chip saw 1. The brush moving unit 21 also can be designed to move both rotational brushes 19a and 19b and adjust the distance between the brushes 19a and 19b.

According to the above embodiment, a liquid is supplied between the rotational brushes 19a, 19b and the honing-subjected part 5 of the chip saw 1, and the honing process is carried out while rotating the chip saw 1. Therefore, the time for the honing process can be shortened, abrasives can be easily managed, and the work efficiency of the honing process can be improved.

Sawdust is not generated because the liquid is used, and countermeasures can be easily taken against environmental problems, and resources can be effectively used because the liquid is easily recycled.

What is claimed is:

1. A method of honing a chip saw comprising the steps of:
   rotating the chip saw in which chips are brazed onto a peripheral edge thereof;
   bringing a rotational brush into contact with a rotating honing-subjected portion of the peripheral edge of the chip saw; and
   supplying a liquid having abrasive properties to a part in which the rotational brush is in contact with the honing-subjected portion.

2. The honing method of claim 1, wherein the liquid is recycled and is again used.

3. The honing method of claim 1, wherein the chip saw is rotated while being clamped.

4. The honing method of claim 1, wherein the liquid contains dustproof oil.

5. The honing method of claim 1, wherein the liquid contains abrasive powder having abrasive properties.

6. An apparatus for honing a chip saw, comprising:

chip saw rotating means for rotating the chip saw in which chips are brazed onto a peripheral edge thereof at predetermined rotating speed;

brush rotating means for bringing a rotational brush into contact with a honing-subjected portion of the chip saw rotating by said chip saw rotating means while rotating the rotational brush; and liquid supplying means for supplying a liquid having abrasive properties between the rotational brush rotating by said brush rotating means and the honing-subjected portion of the chip saw rotating by said chip saw rotating means.

7. The honing apparatus of claim 6, wherein said chip saw rotating means clamps the chip saw.

8. The honing apparatus of claim 7, wherein said chip saw rotating means includes a first clamp body that does not move in the direction of clamping and a second clamp body that can move to and from said first clamp body and sandwich the chip saw together with said first clamp.

9. The honing apparatus of claim 8, wherein said chip saw rotating means includes a chip saw rotating unit for rotating the first clamp body and a chip saw clamping unit for moving the second clamp body toward or backward and following the rotation of the first clamp body.

10. The honing apparatus of claim 6, wherein the liquid contains dustproof oil.

11. The honing apparatus of claim 6, wherein the liquid contains abrasive powder having abrasive properties.

12. The honing apparatus of claim 6, further comprising a liquid circulating mechanism for recycling and supplying the liquid that has been used for the honing process to said liquid supplying means.

13. A method of honing a chip saw comprising the steps of:

rotating the chip saw in which chips are brazed onto a peripheral edge thereof;

bringing a rotational brush into contact with a rotating honing-subjected portion of the peripheral edge of the chip saw; and supplying a liquid having abrasive properties to a part in which the rotational brush is in contact with the honing-subjected portion, wherein the liquid is recycled and is again used.

14. The honing method of claim 13, wherein the chip saw is rotated while being clamped.

15. The honing method of claim 13, wherein the liquid contains dustproof oil.

16. The honing method of claim 13, wherein the liquid contains abrasive powder having abrasive properties.

17. A method of honing a chip saw comprising the steps of:

rotating the chip saw in which chips are brazed onto a peripheral edge thereof;

bringing a rotational brush into contact with a rotating honing-subjected portion of the peripheral edge of the chip saw; and supplying a liquid having abrasive properties to a part in which the rotational brush is in contact with the honing-subjected portion, wherein the chip saw is rotated while being clamped.

18. The honing method of claim 17, wherein the liquid is recycled and is again used.

19. The honing method of claim 17, wherein the liquid contains dustproof oil.

20. The honing method of claim 17, wherein the liquid contains abrasive powder having abrasive properties.

21. A method of honing a chip saw comprising the steps of:

rotating the chip saw in which chips are brazed onto a peripheral edge thereof;

bringing a rotational brush into contact with a rotating honing-subjected portion of the peripheral edge of the chip saw; and supplying a liquid having abrasive properties to a part in which the rotational brush is in contact with the honing-subjected portion, wherein the liquid contains dustproof oil.

22. The honing method of claim 21, wherein the liquid is recycled and is again used.

23. The honing method of claim 21, wherein the chip saw is rotated while being clamped.

24. The honing method of claim 21, wherein the liquid contains abrasive powder having abrasive properties.

25. An apparatus for honing a chip saw, comprising:

chip saw rotating means for rotating the chip saw in which chips are brazed onto a peripheral edge thereof at predetermined rotating speed;

brush rotating means for bringing a rotational brush into contact with a honing-subjected portion of the chip saw rotating by said chip saw rotating means while rotating the rotational brush; and liquid supplying means for supplying a liquid having abrasive properties between the rotational brush rotating by said brush rotating means and the honing-subjected portion of the chip saw rotating by said chip saw rotating means, wherein said chip saw rotating means clamps the chip saw.

26. The honing apparatus of claim 25, wherein said chip saw rotating means includes a first clamp body that does not move in the direction of clamping and a second clamp body that can move to and from said first clamp body and sandwich the chip saw together with said first clamp.

27. The honing apparatus of claim 26, wherein said chip saw rotating means includes a chip saw rotating unit for rotating the first clamp body and a chip saw clamping unit for moving the second clamp body toward or backward and following the rotation of the first clamp body.

28. The honing apparatus of claim 25, wherein the liquid contains dustproof oil.

29. The honing apparatus of claim 25, wherein the liquid contains abrasive powder having abrasive properties.

30. The honing apparatus of claim 25, further comprising a liquid circulating mechanism for recycling and supplying the liquid that has been used for the honing process to said liquid supplying means.

31. An apparatus for honing a chip saw, comprising:

chip saw rotating means for rotating the chip saw in which chips are brazed onto a peripheral edge thereof at predetermined rotating speed;

brush rotating means for bringing a rotational brush into contact with a honing-subjected portion of the chip saw rotating by said chip saw rotating means while rotating the rotational brush; and liquid supplying means for supplying a liquid having abrasive properties between the rotational brush rotating by said brush rotating means and the honing-subjected portion of the chip saw rotating by said chip saw rotating means, wherein the liquid contains dustproof oil.

32. The honing apparatus of claim 31, wherein said chip saw rotating means clamps the chip saw.

33. The honing apparatus of claim 32, wherein said chip saw rotating means includes a first clamp body that does not move in the direction of clamping and a second clamp body that can move to and from said first clamp body and sandwich the chip saw together with said first clamp.

34. The honing apparatus of claim 33, wherein said chip saw rotating means includes a chip saw rotating unit for rotating the first clamp body and a chip saw clamping unit for moving the second clamp body toward or backward and following the rotation of the first clamp body.

35. The honing apparatus of claim 31, wherein the liquid contains abrasive powder having abrasive properties.

36. The honing apparatus of claim 31, further comprising a liquid circulating mechanism for recycling and supplying the liquid that has been used for the honing process to said liquid supplying means.

37. An apparatus for honing a chip saw, comprising:

chip saw rotating means for rotating the chip saw in which chips are brazed onto a peripheral edge thereof at predetermined rotating speed;

brush rotating means for bringing a rotational brush into contact with a honing-subjected portion of the chip saw rotating by said chip saw rotating means while rotating the rotational brush;

liquid supplying means for supplying a liquid having abrasive properties between the rotational brush rotating by said brush rotating means and the honing-subjected portion of the chip saw rotating by said chip saw rotating means; and a liquid circulating mechanism for recycling and supplying the liquid that has been used for the honing process to said liquid supplying means.

38. The honing apparatus of claim 37, wherein said chip saw rotating means clamps the chip saw.

39. The honing apparatus of claim 38, wherein said chip saw rotating means includes a first clamp body that does not move in the direction of clamping and a second clamp body that can move to and from said first clamp body and sandwich the chip saw together with said first clamp.

40. The honing apparatus of claim 39, wherein said chip saw rotating means includes a chip saw rotating unit for rotating the first clamp body and a chip saw clamping unit for moving the second clamp body toward or backward and following the rotation of the first clamp body.

41. The honing apparatus of claim 37, wherein the liquid contains dustproof oil.

42. The honing apparatus of claim 37, wherein the liquid contains abrasive powder having abrasive properties.

* * * * *